(12) United States Patent
Smith (10) Patent No.: US 9,918,562 B1
(45) Date of Patent: Mar. 20, 2018

(54) ELECTRONIC EDUCATION SYSTEM (71) Applicant: Amber Smith, Columbus, OH (US)

(72) Inventor: Amber Smith, Columbus, OH (US)

( * ) Notice: Subject to any disclaimer, the term of this patent is extended or adjusted under 35 U.S.C. 154(b) by 0 days.

(21) Appl. No.: 15/340,623

(22) Filed: Nov. 1, 2016

(51) Int. Cl.
A47D 1/00 (2006.01)
A47D 15/00 (2006.01)
G09B 5/02 (2006.01)

(52) U.S. Cl.
CPC ............. *A47D 1/008* (2013.01); *A47D 15/00* (2013.01); *G09B 5/02* (2013.01)

(58) Field of Classification Search
CPC ... G09B 3/00; G09B 3/02; G09B 3/06; A47D 15/00; A47D 11/00; A47D 1/00; A47D 11/08
See application file for complete search history.

(56) References Cited

U.S. PATENT DOCUMENTS

| 4,946,180 A * | 8/1990 | Baer ..................... A47D 1/008 280/39 |
| 6,589,058 B2 | 7/2003 | Brooks |
| 7,065,319 B1 | 6/2006 | Hartley |
| D557,022 S | 12/2007 | Desnos |
| 8,007,043 B1 | 8/2011 | Vuong |
| 8,758,135 B2 | 6/2014 | Carter et al. |
| 8,931,839 B1 | 1/2015 | Laurel, Jr. |
| 9,167,911 B2 | 10/2015 | Vlosich |
| 2009/0033118 A1* | 2/2009 | Gomez ..................... B62B 9/12 296/37.4 |
| 2009/0179394 A1 | 7/2009 | Huber et al. |

FOREIGN PATENT DOCUMENTS

WO    WO2014043588    3/2014

* cited by examiner

*Primary Examiner* — John Walters
*Assistant Examiner* — James Triggs (57) ABSTRACT An electronic education system includes an electronic device. A chair is provided and a child may sit upon the chair. A tray is removably coupled to the chair. The electronic device is removably coupled to the tray. Thus, the electronic device is accessible to the child. An undercarriage is movably coupled to the chair. The undercarriage is selectively positioned in a deployed position to roll along a support surface. The undercarriage is selectively positioned in retracted position.

13 Claims, 7 Drawing Sheets

ELECTRONIC EDUCATION SYSTEM

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIE THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

(2) Description of Related Art Including Information Disclosed Under 37 CFR 1.97 and 1.98

The disclosure and prior art relates to education devices and more particularly pertains to a new education device combining an educational electronic device, a high chair and a stroller.

BRIEF SUMMARY OF THE INVENTION

An embodiment of the disclosure meets the needs presented above by generally comprising an electronic device. A chair is provided and a child may sit upon the chair. A tray is removably coupled to the chair. The electronic device is removably coupled to the tray. Thus, the electronic device is accessible to the child. An undercarriage is movably coupled to the chair. The undercarriage is selectively positioned in a deployed position to roll along a support surface. The undercarriage is selectively positioned in retracted position.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
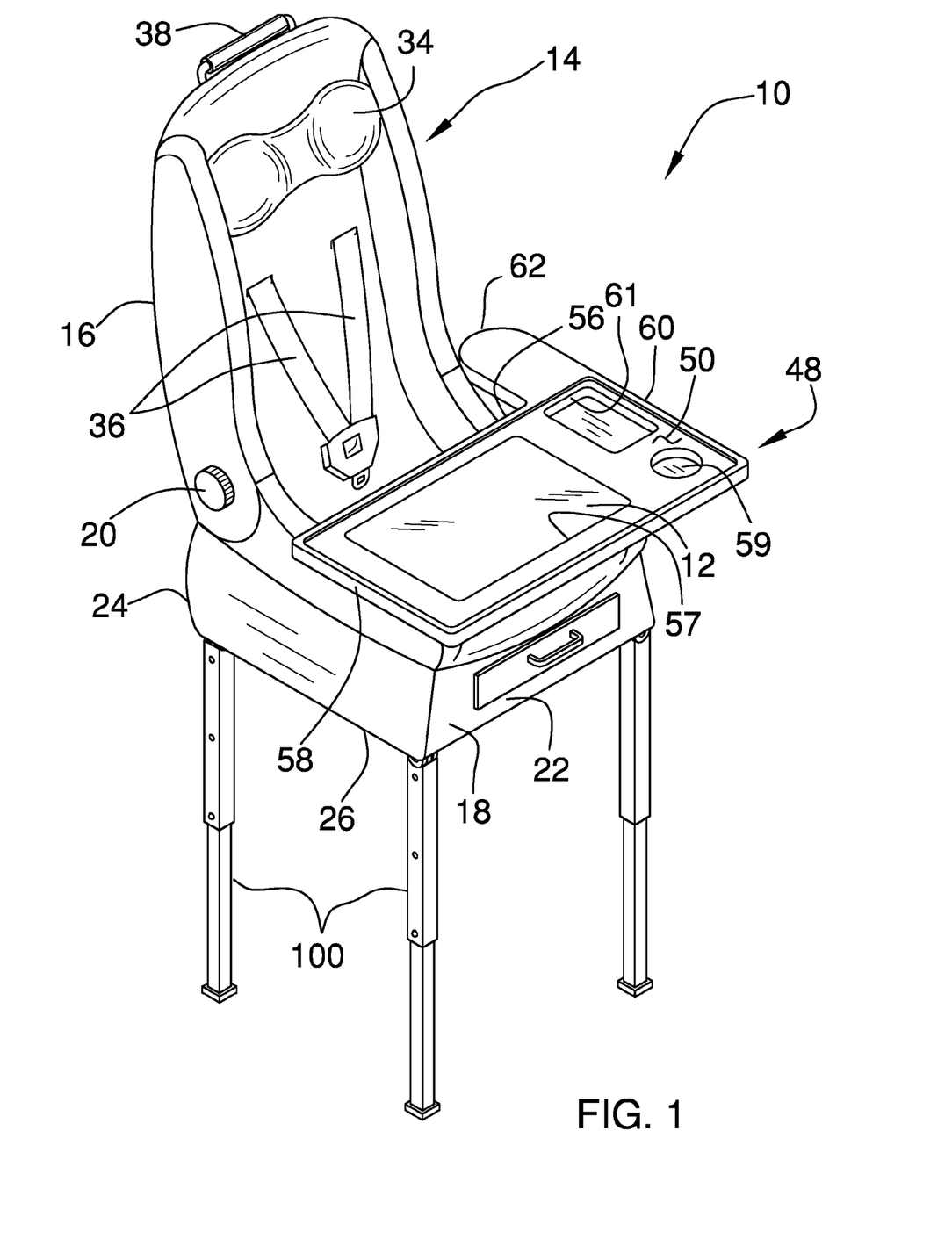
FIG. 1 is a front perspective view of an electronic education system according to an embodiment of the disclosure.
Figure 2:
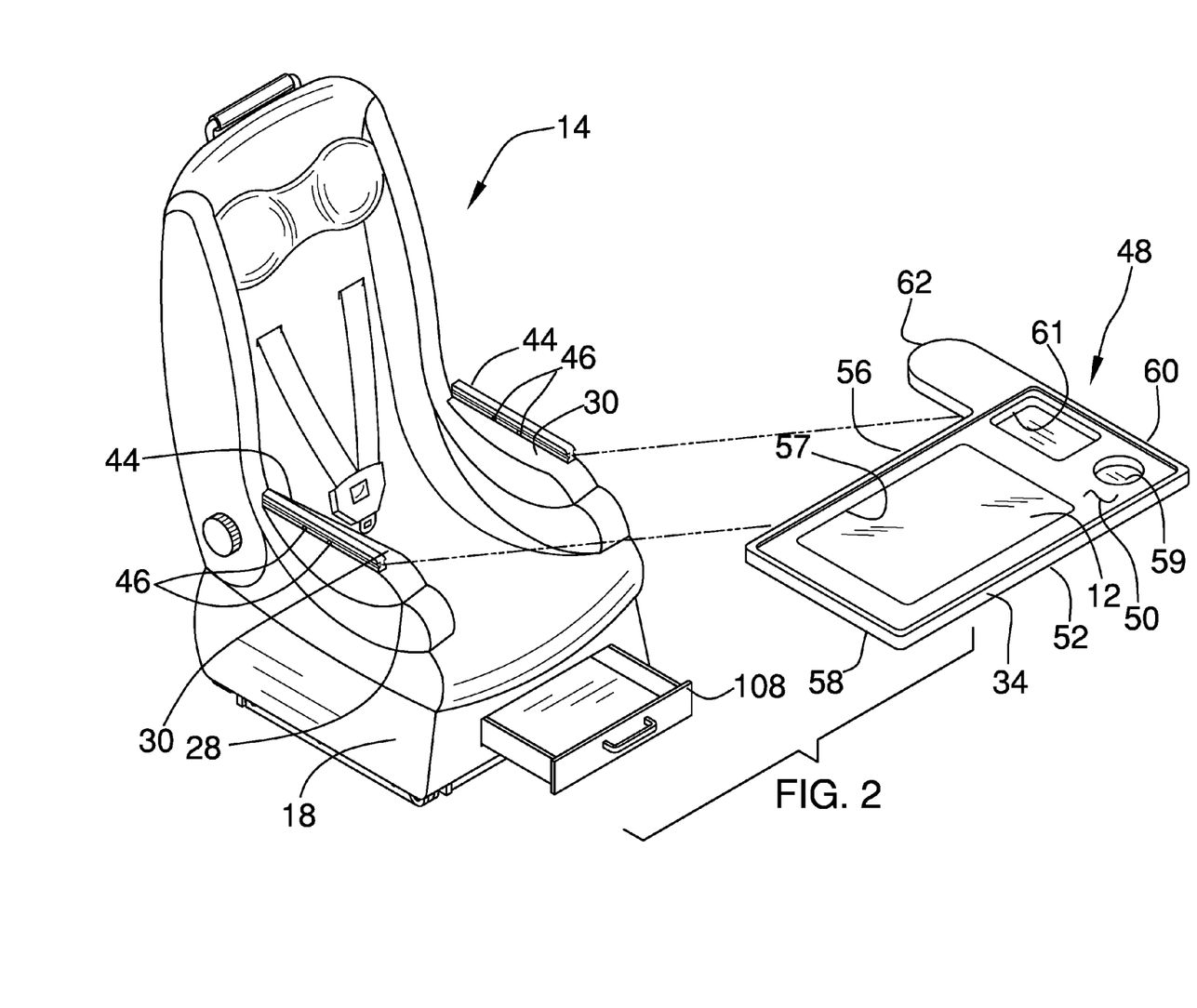
FIG. 2 is an exploded perspective view of an embodiment of the disclosure.
Figure 3:
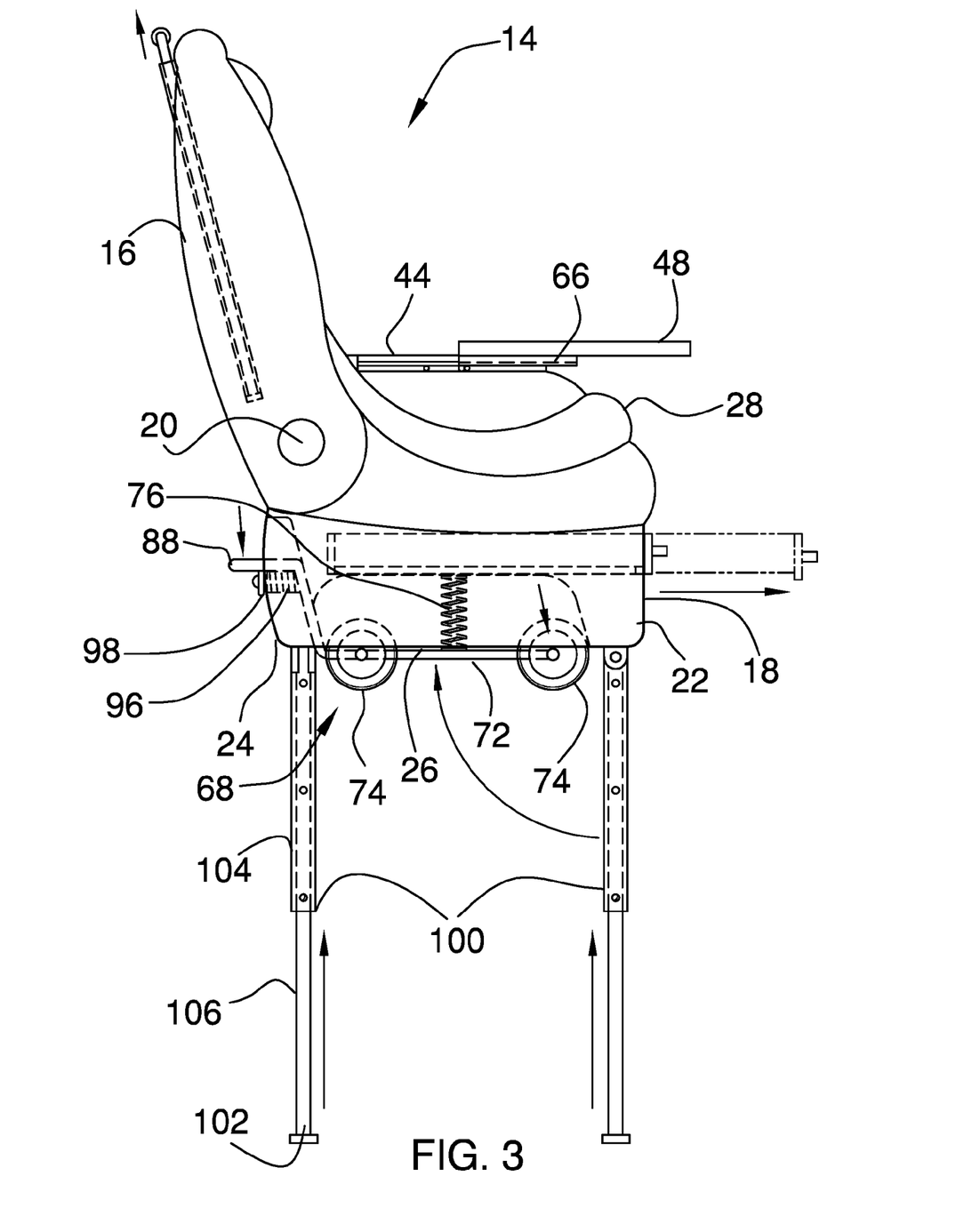
FIG. 3 is a right side phantom view of an embodiment of the disclosure showing an undercarriage in a deployed position.
Figure 4:
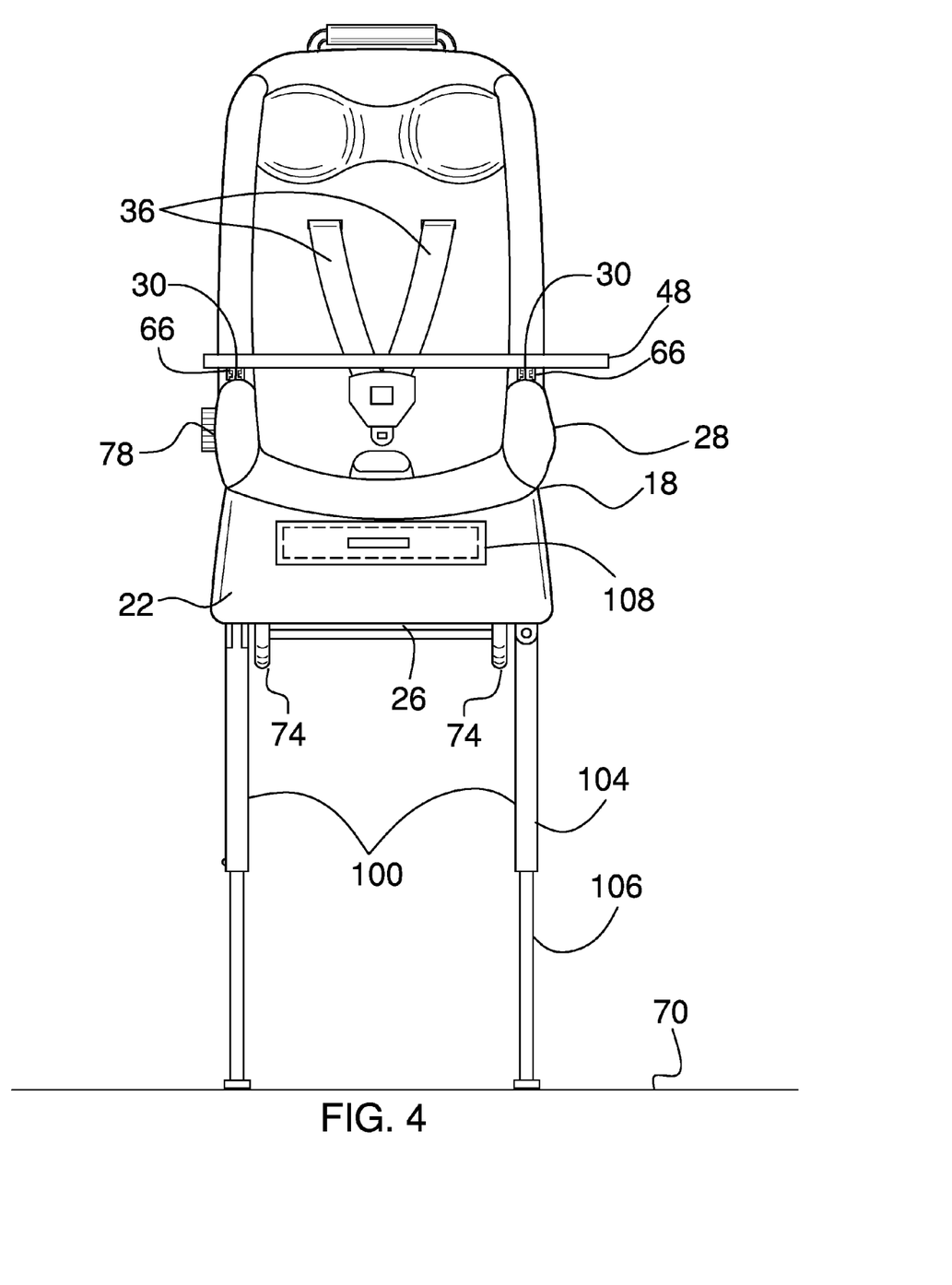
FIG. 4 is a front view of an embodiment of the disclosure.
Figure 5:
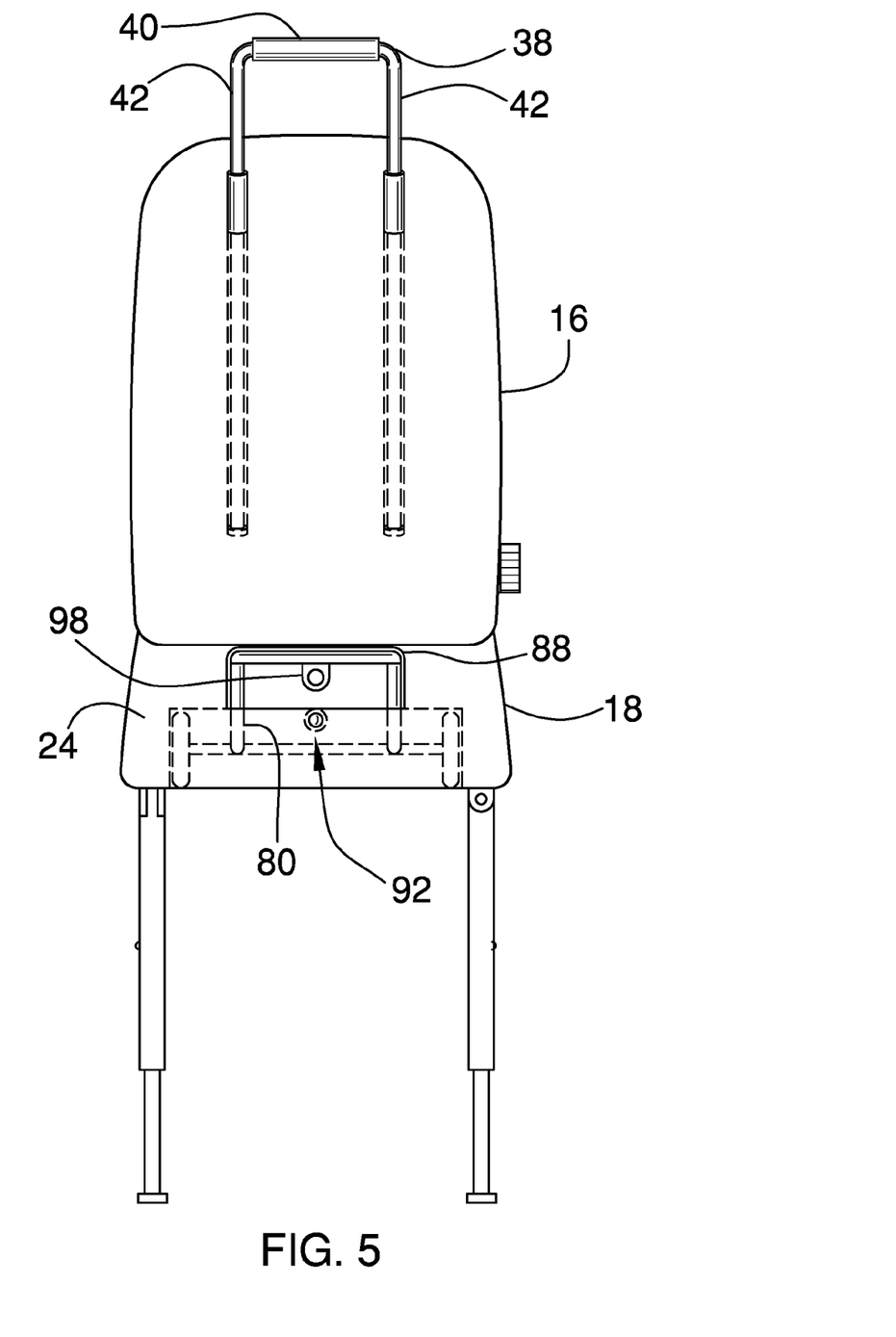
FIG. 5 is a back phantom view of an embodiment of the disclosure.
Figure 6:
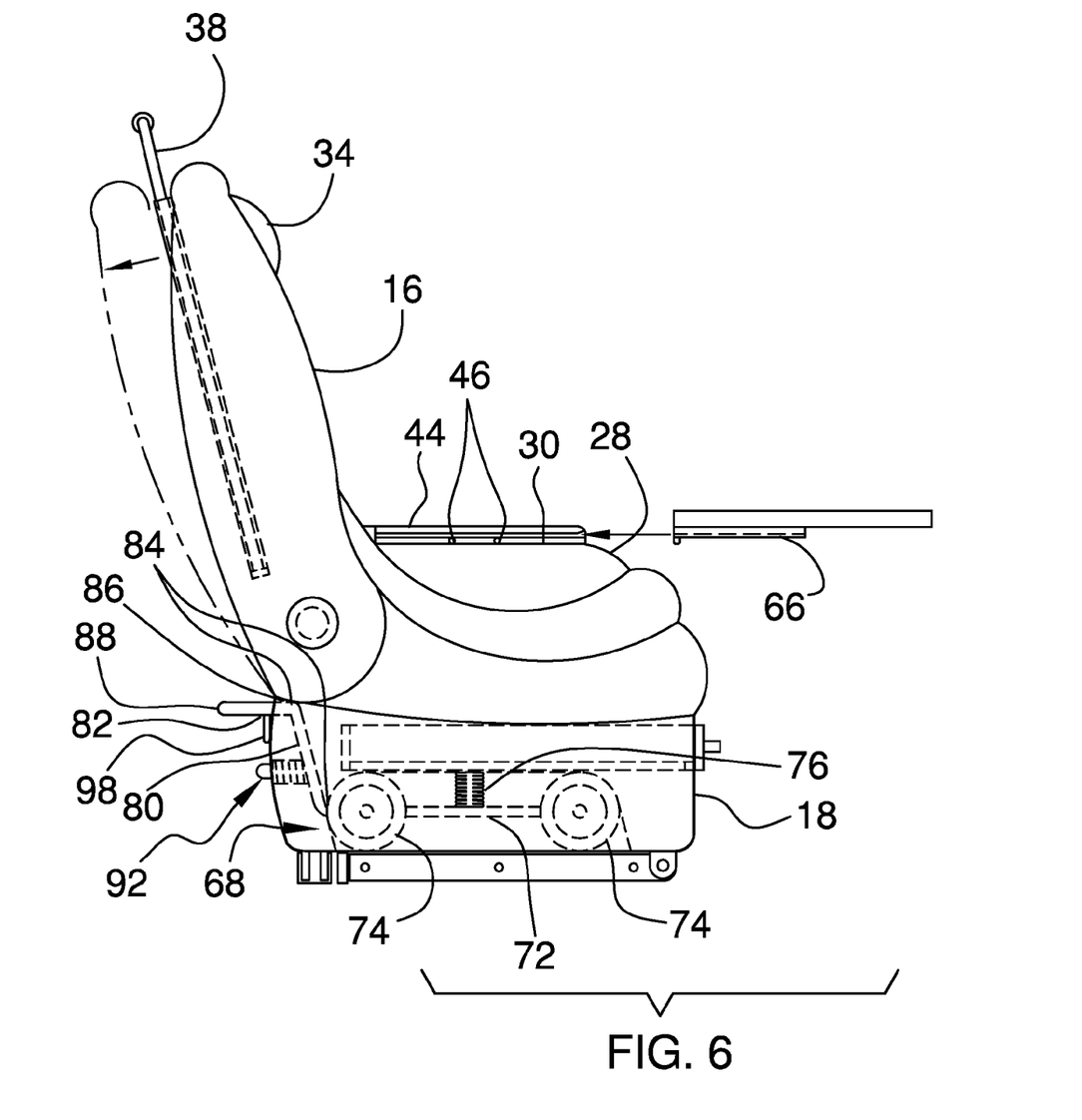
FIG. 6 is a right side phantom view of an embodiment of the disclosure showing an undercarriage in a retracted position.
Figure 7:
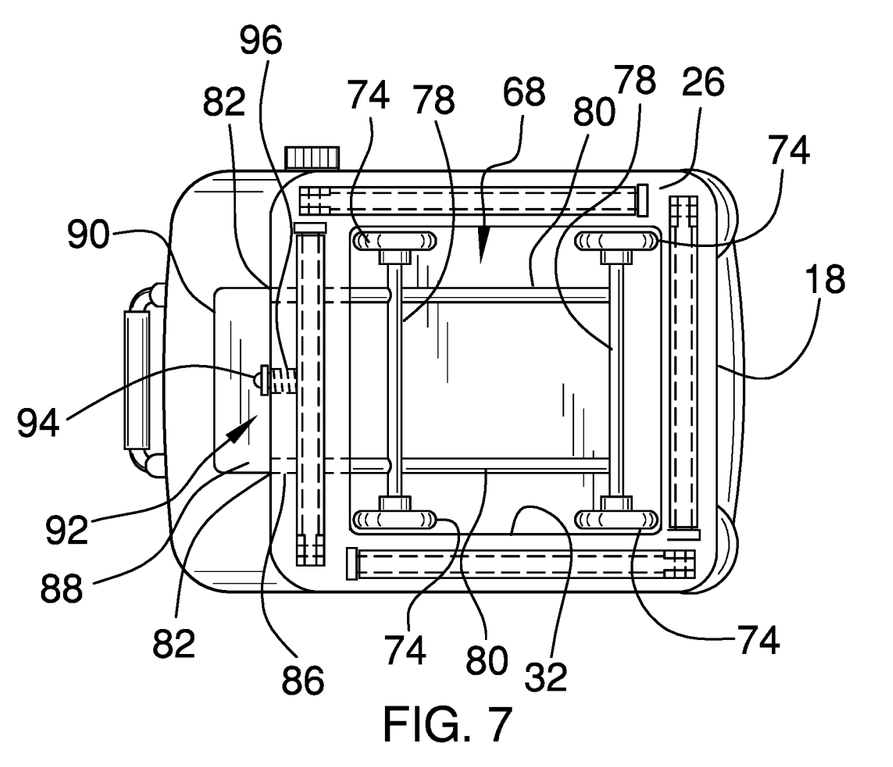
FIG. 7 is a bottom view of an embodiment of the disclosure.

With reference now to the drawings, and in particular to FIGS. 1 through 7 thereof, a new education device embodying the principles and concepts of an embodiment of the disclosure and generally designated by the reference numeral 10 will be described.

As best illustrated in FIGS. 1 through 7, the electronic education system 10 generally comprises an electronic device 12. The electronic device 12 may be manipulated thereby facilitating educational material to be electronically communicated. The electronic device 12 may be a tablet computer or the like. Moreover, the educational material may be an educational computer program or the like.

A chair 14 is provided and a child may sit on the chair 14. The chair 14 has a back rest 16 that is hingedly coupled to a seat 18. The back rest 16 is selectively reclined with respect to the seat 18. An adjustment knob 20 may be rotatably coupled to the back rest 16 to adjust the back rest 16. The seat 18 has a front side 22, a back side 24 and a bottom side 26. The chair 14 includes a pair of arm rests 28 and each of the arm rests 28 has a top side 30. The bottom side 26 of the seat 18 has a well 32 extending upwardly therein.

A pillow 34 may be provided and the pillow 34 may be positioned on the back rest 16. Thus, the pillow 34 may cushion the child's head. A pair of belts 36 may be provided and each of the belts 36 may be positioned on the back rest 16. Each of the belts 36 may be worn around the child to retain the child in the chair 14.

A handle 38 is slidably coupled to the chair 14. The handle 38 is positioned in the back rest 16. Moreover, the handle 38 is selectively positioned between a deployed position and a retracted position. The handle 38 may include a central member 40 extending between a pair of lateral members 42. Each of the lateral members 42 may be slidably coupled to the chair 14.

A pair of rails 44 is provided. Each of the rails 44 is coupled to the top side 30 corresponding to an associated one of the arm rests 28. Moreover, each of the rails 44 is substantially coextensive with the associated arm rest 28.

Each of the rails 44 has a pair of detents 46. The detents 46 are spaced apart from each other.

A tray 48 is provided. The tray 48 is removably coupled to the chair 14 and the tray 48 may support objects. The electronic device 12 is removably coupled to the tray 48. Thus, the electronic device 12 is accessible to the child.

The tray 48 has a top surface 50, a bottom surface 52 and a peripheral edge 54 extending therebetween. The peripheral edge 54 has a rear side 56, a first lateral side 58 and a second lateral side 60. The tray 48 has a lobe 62 extending away from the peripheral edge 54. The lobe 62 is positioned at an intersection of the rear side 56 and the first lateral side 58.

The top surface 50 has a first well 57 extending toward the bottom surface 52. The electronic device 12 is selectively positioned in the first well 57. The top surface 50 has a second well 59 extending toward the bottom surface 52. A beverage container may be positioned in the second well 59. The top surface 50 has a third well 61 extending toward the bottom surface 52. An object may be positioned in the third well 61.

A pair of tracks 66 is provided. Each of the tracks 66 is coupled to the bottom surface 52 of the tray 48. Moreover, each of the tracks 66 is substantially coextensive with an associated one of the first lateral side 58 and the second lateral side 60 of the tray 48. Each of the tracks 66 slidably engages an associated one of the rails 44. Thus, the tray 48 is positioned to be accessible to the child. Each of the tracks 66 engages a selected one of the detents 46 in the associated rail. Thus, the tray 48 is spaced a selected distance from the back rest 16.

An undercarriage 68 is movably coupled to the chair 14. The undercarriage 68 is selectively positioned in a deployed position. Thus, the undercarriage 68 may roll along a support surface 70. The support surface 70 may be ground or the like. The undercarriage 68 is selectively positioned in retracted position.

The undercarriage 68 comprises a frame 72 that is positioned within the well 32 in the seat 18. A plurality of wheels 74 is provided and each of the wheels 74 is rotatably coupled to the frame 72. A biasing member 76 is positioned between the frame 72 and the seat 18. The biasing member 76 biases the frame 72 upwardly into the well. The biasing member 76 may be a spring or the like.

The frame 72 includes a pair of axles 78. Each of the wheels 74 is rotatably coupled to an associated one of the axles 78. A pair of rods 80 is provided. Each of the rods 80 extends between the pair of axles 78 and outwardly from the back side 24 of the seat 18. Each of the rods 80 has a distal end 82 with respect to the back side 24.

Each of the rods 80 has a sequence of bends 84 thereon to define a raised portion 86 of each rod 80. The raised portion 86 extends through the back side 24 of the seat 18. A plate 88 is provided and the plate 88 has a peripheral edge 90. The peripheral edge 90 of the plate 88 is coupled to the distal end 82 corresponding to each of the rods 80. The plate 88 may be stepped on to urge the undercarriage 68 into the deployed position.

A lock 92 is provided. The lock 92 is movably coupled to the seat 18 and the lock 92 may be manipulated. The lock 92 engages the frame 72 when the undercarriage 68 is positioned in the deployed position. Thus, each of the wheels 74 may roll along the support surface 70. The lock 92 disengages the frame 72 when the lock 92 is manipulated. Thus, the biasing member 76 biases the frame 72 upwardly into the well 32.

The lock 92 includes a peg 94 that is positioned on the back side 24 of the seat 18. A spring 96 is positioned between the peg 94 and the back side 24. Thus, the spring 96 biases the peg 94 to extend outwardly from the seat 18. A catch 98 is coupled to and extends downwardly from the plate 88. The peg 94 engages the catch 98 when the undercarriage 68 is urged into the deployed position.

A plurality of legs 100 is provided and each of the legs 100 is hingedly coupled to the bottom side 26 of the seat 18. Thus, the plurality of legs 100 is positionable between a folded position and a deployed position. Each of the legs 100 supports the chair 14 above the support surface 70 when the legs 100 are positioned in the deployed position. Each of the legs 100 has a distal end 102 with respect to the seat 18 and the distal end 102 abuts the support surface 70.

Each of the legs 100 has a first half 104 that is slidably coupled to a second half 106. Thus, each of the legs 100 has a telescopically adjustable length. Each of the legs 100 is positioned in the folded position when the undercarriage 68 is positioned in the deployed position. Thus, the chair 14 may be rolled along the support surface 70. The handle 38 is positioned in the deployed position thereby facilitating the handle 38 to be gripped when the undercarriage 68 is positioned in the deployed position.

A drawer 108 is provided. The drawer 108 is slidably coupled to the seat 18. Moreover, the drawer 108 is positioned on the front side 22 of the seat 18. The drawer 108 stores selected objects.

In use, each of the legs 100 is positioned in the deployed position and the chair 14 is stood on the legs 100. The child is positioned in the chair 14 and the tray 48 is coupled to the chair 14. The electronic device 12 is positioned in the first well 57. Thus, the child manipulates the electronic device 12. Moreover, the tray 48 facilitates play with toys and other activities.

The legs 100 are positioned in the folded position and the plate 88 is stepped on the urge the undercarriage 68 into the deployed position. The handle 38 is urged into the deployed position. Thus, the chair 14 is rolled along the support surface 70 in the convention of a stroller. The peg 94 is urged toward the seat 18 to release the catch 98. Thus, the undercarriage 68 is biased into the retracted position.

With respect to the above description then, it is to be realized that the optimum dimensional relationships for the parts of an embodiment enabled by the disclosure, to include variations in size, materials, shape, form, function and manner of operation, system and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. An electronic education system comprising:
an electronic device being configured to be manipulated thereby facilitating educational material to be electronically communicated;
a chair being configured to have a child sit thereon;
a tray being removably coupled to said chair wherein said tray is configured to support objects, said electronic device being removably coupled to said tray wherein said electronic device is configured to be accessible to the child, said tray having a top surface, a bottom surface and a peripheral edge extending therebetween, said peripheral edge having a rear side, a first lateral side and a second lateral side, said tray having a lobe extending away from said peripheral edge, said lobe being positioned at an intersection of said rear side and said first lateral side; and
an undercarriage being movably coupled to said chair, said undercarriage being selectively positioned in a deployed position wherein said undercarriage is configured to roll along a support surface, said undercarriage being selectively positioned in retracted position.

2. The system according to claim 1, wherein said chair has a back rest being hingedly coupled to a seat, said seat having a front side, a back side and a bottom side, said chair including a pair of arm rests, each of said arm rests having a top side, said bottom side having a well extending upwardly therein.

3. The system according to claim 2, further comprising a handle being slidably coupled to said chair, said handle being positioned in said back rest, said handle being selectively positioned between a deployed position and a retracted position.

4. An electronic education system comprising:
an electronic device being configured to be manipulated thereby facilitating educational material to be electronically communicated;
a chair being configured to have a child sit thereon, said chair has a back rest being hingedly coupled to a seat, said seat having a front side, a back side and a bottom side, said chair including a pair of arm rests, each of said arm rests having a top side, said bottom side having a well extending upwardly therein;
a tray being removably coupled to said chair wherein said tray is configured to support objects, said electronic device being removably coupled to said tray wherein said electronic device is configured to be accessible to the child;
an undercarriage being movably coupled to said chair, said undercarriage being selectively positioned in a deployed position wherein said undercarriage is configured to roll along a support surface, said undercarriage being selectively positioned in retracted position; and
a pair of rails, each of said rails being coupled to said top side corresponding to an associated one of said arm rests, each of said rails being substantially coextensive with said associated arm rest.

5. The system according to claim 1, wherein said top surface has a first well extending toward said bottom surface, said electronic device being selectively positioned in said first well, said top surface having a second well extending toward said bottom surface wherein said second well is configured to receive a beverage container, said top surface having a third well extending toward said bottom surface wherein said third well is configured to receive an object.

6. The system according to claim 1, further comprising:
a pair of rails; and
a pair of tracks, each of said tracks being coupled to said bottom surface of said tray, each of said tracks being substantially coextensive with an associated one of said first lateral side and said second lateral side of said tray, each of said tracks slidably engaging an associated one of said rails such wherein said tray is configured to be accessible to the child.

7. The system according to claim 2, wherein said undercarriage comprises:
a frame being positioned within said well in said seat; and
a plurality of wheels, each of said wheels being rotatably coupled to said frame.

8. An electronic education system comprising:
an electronic device being configured to be manipulated thereby facilitating educational material to be electronically communicated;
a chair being configured to have a child sit thereon, said chair has a back rest being hingedly coupled to a seat, said seat having a front side, a back side and a bottom side, said chair including a pair of arm rests, each of said arm rests having a top side, said bottom side having a well extending upwardly therein;
a tray being removably coupled to said chair wherein said tray is configured to support objects, said electronic device being removably coupled to said tray wherein said electronic device is configured to be accessible to the child;
an undercarriage being movably coupled to said chair, said undercarriage being selectively positioned in a deployed position wherein said undercarriage is configured to roll along a support surface, said undercarriage being selectively positioned in retracted position, said undercarriage including a frame being positioned within said well in said seat, said undercarriage including a plurality of wheels, each of said wheels being rotatably coupled to said frame; and
a biasing member being positioned between said frame and said seat, said biasing member biasing said frame upwardly into said well.

9. The system according to claim 8, further comprising a lock being movably coupled to said seat wherein said lock is configured to be manipulated, said lock engaging said frame when said undercarriage is positioned in said deployed position wherein each of said wheels is configured to roll along the support surface, said lock disengaging said frame when said lock is manipulated such that said biasing member urges said frame upwardly into said well.

10. The system according to claim 2, further comprising a plurality of legs, each of said legs being hingedly coupled to said bottom side of said seat such that said plurality of legs is positionable between a folded position and a deployed position, each of said legs being configured to support said chair above the support surface when said legs are positioned in said deployed position, each of said legs having a distal end with respect to said seat, said distal end being configured to abut the support surface.

11. An electronic education system comprising:
an electronic device being configured to be manipulated thereby facilitating educational material to be electronically communicated;
a chair being configured to have a child sit thereon, said chair has a back rest being hingedly coupled to a seat, said seat having a front side, a back side and a bottom side, said chair including a pair of arm rests, each of said arm rests having a top side, said bottom side having a well extending upwardly therein;

a tray being removably coupled to said chair wherein said tray is configured to support objects, said electronic device being removably coupled to said tray wherein said electronic device is configured to be accessible to the child;

an undercarriage being movably coupled to said chair, said undercarriage being selectively positioned in a deployed position wherein said undercarriage is configured to roll along a support surface, said undercarriage being selectively positioned in retracted position;

a plurality of legs, each of said legs being hingedly coupled to said bottom side of said seat such that said plurality of legs is positionable between a folded position and a deployed position, each of said legs being configured to support said chair above the support surface when said legs are positioned in said deployed position, each of said legs having a distal end with respect to said seat, said distal end being configured to abut the support surface;

wherein said chair includes a handle; and wherein each of said legs has a first half being slidably coupled to a second half such that each of said legs has a telescopically adjustable length, each of said legs being positioned in said folded position when said undercarriage is positioned in said deployed position wherein said chair is configured to be rolled along the support surface, said handle being positioned in said deployed position thereby facilitating said handle to be gripped when said undercarriage is positioned in said deployed position.

12. An electronic education system comprising:

an electronic device being configured to be manipulated thereby facilitating educational material to be electronically communicated;

a chair being configured to have a child sit thereon, said chair has a back rest being hingedly coupled to a seat, said seat having a front side, a back side and a bottom side, said chair including a pair of arm rests, each of said arm rests having a top side, said bottom side having a well extending upwardly therein;

a tray being removably coupled to said chair wherein said tray is configured to support objects, said electronic device being removably coupled to said tray wherein said electronic device is configured to be accessible to the child;

an undercarriage being movably coupled to said chair, said undercarriage being selectively positioned in a deployed position wherein said undercarriage is configured to roll along a support surface, said undercarriage being selectively positioned in retracted position; and a drawer being slidably coupled to said seat, said drawer being positioned on said front side of said seat.

13. The system according to claim 12, further comprising:

a handle being slidably coupled to said chair, said handle being positioned in said back rest, said handle being selectively positioned between a deployed position and a retracted position;

a pair of rails, each of said rails being coupled to said top side corresponding to an associated one of said arm rests, each of said rails being substantially coextensive with said associated arm rest;

said tray having a top surface, a bottom surface and a peripheral edge extending therebetween, said peripheral edge having a rear side, a first lateral side and a second lateral side, said tray having a lobe extending away from said peripheral edge, said lobe being positioned at an intersection of said rear side and said first lateral side, said top surface having a first well extending toward said bottom surface, said electronic device being selectively positioned in said first well, said top surface having a second well extending toward said bottom surface wherein said second well is configured to receive a beverage container, said top surface having a third well extending toward said bottom surface wherein said third well is configured to receive an object;

a pair of tracks, each of said tracks being coupled to said bottom surface of said tray, each of said tracks being substantially coextensive with an associated one of said first lateral side and said second lateral side of said tray, each of said tracks slidably engaging an associated one of said rails such wherein said tray is configured to be accessible to the child;

said undercarriage comprising:

a frame being positioned within said well in said seat, a plurality of wheels, each of said wheels being rotatably coupled to said frame, a biasing member being positioned between said frame and said seat, said biasing member biasing said frame upwardly into said well, and a lock being movably coupled to said seat wherein said lock is configured to be manipulated, said lock engaging said frame when said undercarriage is positioned in said deployed position wherein each of said wheels is configured to roll along the support surface, said lock disengaging said frame when said lock is manipulated such that said biasing member urges said frame upwardly into said well; and a plurality of legs, each of said legs being hingedly coupled to said chair such that said plurality of legs is positionable between a folded position and a deployed position, each of said legs being configured to support said chair above the support surface when said legs are positioned in said deployed position, each of said legs being hingedly coupled to said bottom side of said seat, each of said legs having a distal end with respect to said seat, said distal end being configured to abut the support surface, each of said legs having a first half being slidably coupled to a second half such that each of said legs has a telescopically adjustable length, each of said legs being positioned in said folded position when said undercarriage is positioned in said deployed position wherein said chair is configured to be rolled along the support surface, said handle being positioned in said deployed position thereby facilitating said handle to be gripped when said undercarriage is positioned in said deployed position.

* * * * *